United States Patent [19]

Kille et al.

[11] Patent Number: 4,550,266
[45] Date of Patent: Oct. 29, 1985

[54] RECIPROCATING ARMATURE MOTOR FOR DRIVING ELECTRICAL EQUIPMENT

[75] Inventors: Ewald Kille; Heinrich Griebel, both of Friedrichshafen, Fed. Rep. of Germany

[73] Assignee: J. Wagner GmbH, Fed. Rep. of Germany

[21] Appl. No.: 581,806

[22] Filed: Feb. 21, 1984

[30] Foreign Application Priority Data

Jan. 21, 1984 [EP] European Pat. Off. ........ 84100633.1

[51] Int. Cl.$^4$ .......................................... H02K 33/00
[52] U.S. Cl. ...................................... 310/19; 310/21; 310/20
[58] Field of Search ................. 310/17, 19, 20, 21, 310/22, 30, 31

[56] References Cited

U.S. PATENT DOCUMENTS

| | | | |
|---|---|---|---|
| 1,565,336 | 12/1925 | Seufert | 310/21 X |
| 1,776,651 | 9/1930 | Chester | 310/216 |
| 1,950,115 | 3/1934 | Kuenzli et al. | 310/19 X |
| 2,346,474 | 4/1944 | De La Torre | 310/17 X |
| 2,424,551 | 7/1947 | Brown | 310/22 |
| 2,451,789 | 10/1948 | Wallace | 310/21 |
| 2,753,898 | 7/1956 | MacFarland | 310/296 |
| 2,771,102 | 11/1956 | Carmichael | 310/296 |
| 3,317,764 | 5/1967 | Dremel | 310/19 X |

*Primary Examiner*—Donovan F. Duggan
*Attorney, Agent, or Firm*—Hill, Van Santen, Steadman & Simpson

[57] ABSTRACT

A reciprocating armature motor for electrically driving equipment such as a piston pump for a paint spray gun or a diaphragm compressor characterized by a stator having a solenoid, an armature pivotally mounted at one end to the stator and having a second end acting upon a member of the equipment to be actuated to move the member back and forth along a path when the armature moves relative to the stator with a reciprocating motion and an arrangement for controlling the reciprocating motor of the armature including a coupling link forming a positive link between the armature and a stationary element which coupling link moves depending on the reciprocating motion of the armature. In one embodiment, the coupling link is composed of a pair of pivotally connected arms forming an articulated link which interconnect the armature to the stationary element and coact with a stop to limit the movement of the armature toward the stator. In another embodiment, the coupling link is formed by a cam disk mounted for rotation on the stator and a torsion spring having one end connected to the armature and the other end connected to the link to hold the armature in contact with the cam disk.

19 Claims, 5 Drawing Figures

RECIPROCATING ARMATURE MOTOR FOR DRIVING ELECTRICAL EQUIPMENT

BACKGROUND OF THE INVENTION

This invention is related to an reciprocating armature motor to electrically drive equipment and in particular for driving a piston pump of a paint spray gun, a diaphragm compressor or similar equipment. The motor includes a stator holding a solenoid and an armature attached at one end to the stator by pivotal means and acting with its second end on a member to be actuated, which member is part of the equipment.

Armature motors or driving motors of this type have been known in numerous various constructions and have proven to be extremely practical. In order to dampen the impact of the armature, which is pivotally mounted on one end as it is attracted by the stator and thus to reduce the operating noise involved in many cases, it has been suggested that a pocket with a rubber disk serving as a stop be provided in a casing in a position relative to the stator to engage the armature and prevent its contact with the stator. The dimensions of the pocket and the rubber disk have, however, certain tolerances so that the point at which the armature will be stopped during its reciprocating motion cannot be exactly determined. If, for instance, the rubber disk has too great a thickness so that it extends past the face of the stator, the remaining air gap is large and the efficiency of the motor is greatly reduced. However, if the rubber stop does not protrude a sufficient amount past the face of the stator, the material will be compressed and the metal armature will hit the stator face causing high operating noises. The position at which the armature reverses its reciprocating movement or motion cannot be exactly determined by the variety of configurations heretofore known and it is also a considerable disadvantage that a positive setting and/or further adjustment of the stop is not possible. Such an adjustment of the stop can only be obtained by replacing the rubber disk with another disk having a different thickness.

SUMMARY OF THE INVENTION

The present invention is directed to providing an improved reciprocating armature motor of the above mentioned configuration in which the reciprocating advanced motion of the armature can be easily and precisely controlled and set by a simple means. In addition, an object of the present invention is that an adjustment or variation of the stop cooperating with the armature is possible without difficulties. On the other hand, other objects are to insure that the repeated metal-to-metal contact between the armature and the stator is reliably prevented and that subsequent damage to these parts is almost excluded. A still further object of the present invention is that the operating noise level is maintained as low as possible.

In order to accomplish these objects, the present invention is directed to an improved reciprocating armature motor to drive equipment, in particular for driving piston pumps of paint spray guns, diaphragm compressors and the like, said motor having a stator holding a solenoid mounted in a casing, an armature being pivotally mounted at one end to the stator and having a second end acting upon a member of the equipment to be actuated to move the member back and forth along a path when the armature moves relative to the stator with an reciprocating motion, and means for controlling the reciprocating motion of the armature including means for forming a positive link between the second end and an element stationary with respect to the casing including a coupling link which varies its position depending upon the reciprocations of the armature.

In one embodiment, a double arm articulated link can be used as the coupling link to limit the reciprocating stroke of the armature. This articulated link is arranged to pivot about axes extending perpendicularly to the direction of movement of the armature and preferably one of the arms is pivotally mounted to the second end of the armature while the other arm is pivotally mounted onto a structural element which is fixed relative to the casing and preferably is fixed to a part of the casing. Movement of the articulated link is limited by a stop cooperating directly or indirectly via an intermediate element with one of the swivel-type connecting arms of the double arm articulated link and the stop is used to limit the reciprocating movement of the armature toward the stator which movement is determined by the swivel range of the articulated link as it moves to a straight line extension.

In this arrangement, the pivotal connection of one of the arms to the armature is by a pin such as an articulation pin which passes through the armature. The member is also preferably connected by the articulated pin such as by having a hooked means for engagement on the pin.

It is also recommended to form the connection between the other arm and the stationary element by a pivot pin connecting the end of the other arm to a suitable lug or similar means on one of the walls of the casing or housing of the reciprocating armature motor. The two arms are preferably interconnected by a pivotal connection and it is desirable that at least one of the arms has a fork-shaped end or bifurcated end to form this pivotal connection between the arms.

Instead of the arms engaging a stop to limit the advance movement of the armature toward the stator, a modification provides a plate on one of the two arms of the articulated link preferably the arm connected to the stationary element which plate will engage the stop. Due to the fact that the length of the plate can be chosen, a particular fine adjustment of the limit position of the armature can be attained. In addition, the stop can be threadably mounted on a wall of the casing so that the stop is adjustable.

In another embodiment of the invention, the coupling link is formed by one or more cam disks, means to pivotally mount the disks on the stator and by one or more torsion springs which are pivotally connected to the cam disk and the armature to hold the armature in contact with the cam disk. In this embodiment, the mounting means for the cam disks are a pin which is connected to a fork-shaped lug of the stator. In this arrangement, the end of the member which is actuated by the armature is preferably provided with a fork shape or bifurcated end which extends on both sides of the lug on the stator which supports the cam disk. In this way, jamming of the member to be actuated is largely avoided.

In order to provide a positive location for the torsion spring and to insure a balancing of the necessary positional changes, it is also beneficial to locate one end of the spring on a pin attached to the armature and the other end of the spring is received in a slot or hole radially spaced from the axis of rotation for the cam member or disk.

In order to prevent friction, it is also possible to provide one or more rotary disks or cam followers on the armature for contacting the surface of the cam disk. The rotational mounting of the cam follower is preferably accomplished by a support pin which also preferably pivotally mounts the end of the member to be actuated to the second end of the armature.

The external contour of the cam disk can be chosen such that it is always touching the armature at the same point in any reciprocating position. In this way, friction is also reduced. The external contour of the cam disk and the pivotal mounting of the torsion springs can also be chosen in a way that no spring load is exerted by the torsion spring over the entire reciprocating range of the armature.

Due to the configuration of the reciprocating armature motor of the invention, it is possible by a very simple means to control the reciprocating advance movement of the armature and to set the remaining air gap between the armature and the stator precisely and in such a way that it is insured that a hitting metal contact of the armature on the stator is positively prevented and any high operating noises are avoided. By connecting the armature by means of the coupling link of various designs to a stationarily fixed element or component, it is possible to limit the reciprocating advance movement of the armature by means of a coupling link and to control this movement at the same time. The remaining air gap between the armature and the stator can be chosen as a very small gap due to the fact that with a suitable configuration of the connecting link of the articulated link used as a coupling link or by means of the intermediate member attached to the latter by means of the cam disk, a very precise fine adjustment is possible so that the reciprocating armature motor can always be operated at a high electrical efficiency. Due to the fact that the cooperating elements can be chosen of a relatively large size and that the stop can be made adjustable, any possible wear is very low and the coupling link can be easily adjusted for any wear. The operating characteristics of the well known reciprocating armature motor can therefore be improved very easily by this simple means.

DESCRIPTION OF THE PREFERRED EMBODIMENTS

Figure 1:
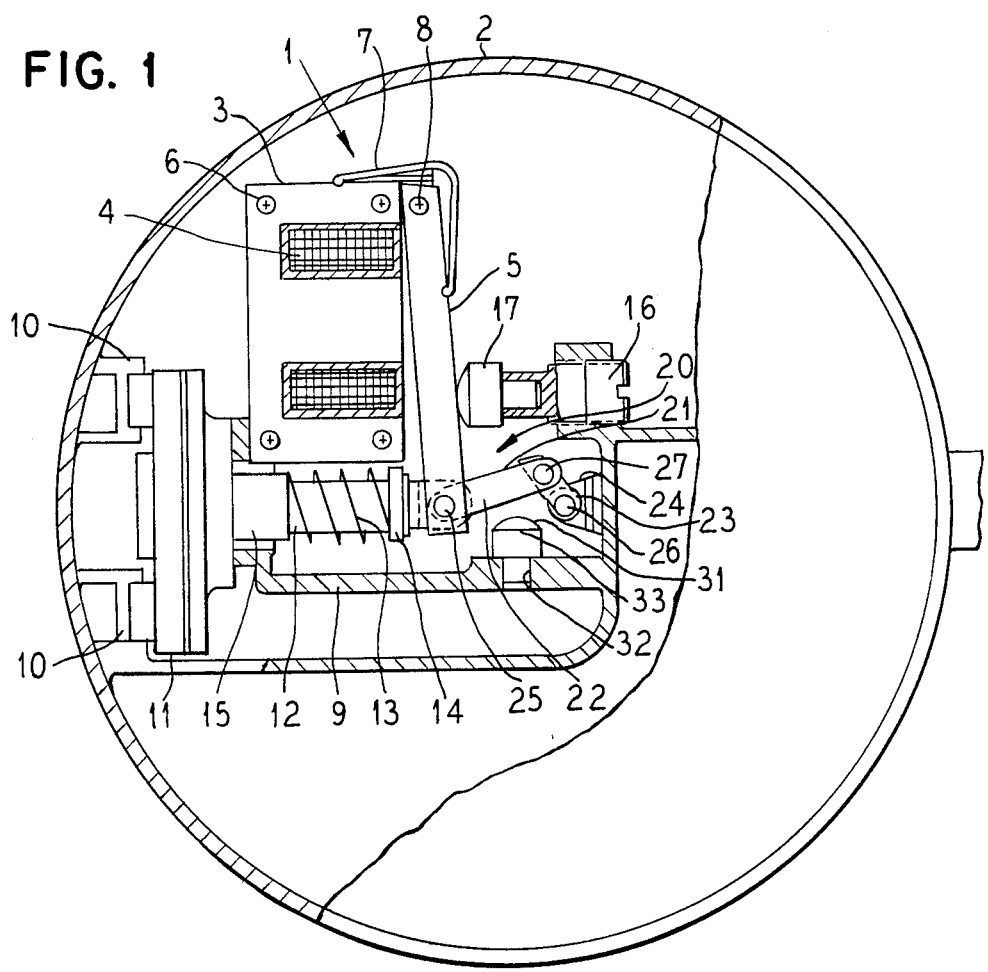
FIG. 1 is a plan view with portions broken away for purposes of illustration of a diaphragm compressor having an reciprocating armature motor with an articulated link in accordance with the present invention.

The principles of the present invention are particularly useful for an reciprocating armature motor generally indicated at 1 in FIG. 1 which motor is illustrated as being installed in a circular casing or housing 2. As illustrated, the armature motor 1 comprises a stationary stator 3 which holds a solenoid 4. The stator 3 is mounted in the casing 2 by bolts 6. An armature 5 is pivotally mounted to the stator at one end by means of an articulation 8 and a holding spring 7. The free or second end of the armature 5 is pivotally connected by a pin 25 to a plunger 12 of a diaphragm compressor 11 which is located or mounted by brackets 10 in the casing 2 and generates an air pressure.

If the solenoid 4 of the stator 3 is connected to power and energized, the magnetic field generated causes the stator 3 to attract armature 5 and pull it toward the stator. This movement of the armature toward the stator is assisted by the holding spring 7 and opposed by a coil spring 13 which surrounds the shaft of the plunger 12 and extends between a collar or shoulder 15 of the diaphragm compressor 11 and a collar 14 of the plunger 12. Thus, when the solenoid 4 is deenergized, the spring 13, which opposes movement of the armature toward the stator, will move the armature away from the stator. Thus, a reciprocal movement of the diaphragm compressor 11 will occur with the intake air being compressed and ejected during each time the solenoid is energized. An adjusting screw 16, which is mounted in a part of the housing or casing wall 9, supports a buffer cap or stop 17 of flexible material which is used to infinitely vary the reciprocating stroke of the armature 5.

In order to prevent the armature 5 from hitting the stator 3 and to prevent high operating noises by the magnetic field being generated, means for controlling the reciprocating motion of the armature including a coupling link 20 is provided. As illustrated, the coupling link 20 is a double arm articulated link 21 which has a pair of arms 22 and 23 pivotally connected together by a pin 27. One end of the arm 22 is connected by the pin 25 to both the plunger 12 and the second end of the armature 5 and the other end of the arm 23 is pivotally mounted by a pin 26 to a lug 24 of the housing wall 9. In addition, a suitable stop 31 is provided in the housing wall 9 to limit the swivel movement of the articulated link 21 toward a straight line extension and to limit the amount of advancement of the armature 5 toward the stator 3.

Figure 2:
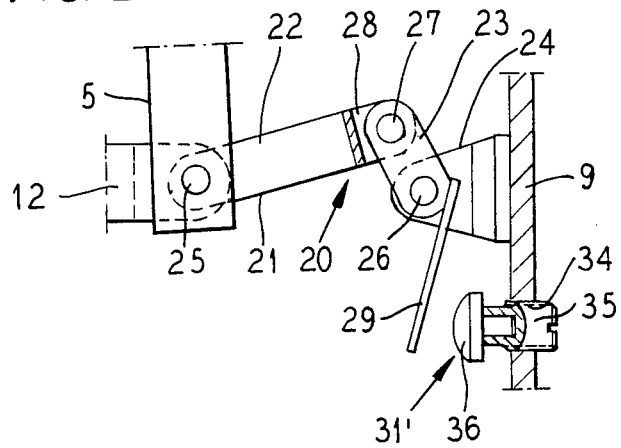
FIG. 2 is a modification of the articulated link of the compressor of FIG. 1.

The stop 31 in the configuration illustrated in FIG. 1 comprises a buffer cap 33 of a flexible, elastic material which is mounted on the wall 9 by being inserted into a hole or bore 32. In the modification illustrated in FIG. 2, a stop 31' consists of a buffer cap 36 of elastic material which is carried on a threaded member 35 which is threaded in a hole 34 of the casing wall 9 so that the stop 31' can be varied in its relative position to the articulated link.

The stop 31 cooperates with the arm 22 of the articulated link 21 and limits the movement of the arms or links 22 and 23 to a full line extension on the axis of the plunger 12. In the modification illustrated in FIG. 2, a plate or stop tab 29 is secured onto the arm 23 and engages the stop 31' as the two links move toward a straight line extension. The adjusting of the position of the stop 31' will determine the point of engagement with the plate 29 and determine the limited position for the link 21.

As illustrated, the arms 22 and 23 are pivotally connected together by a pin 27. In the modification illustrated in FIG. 2, the arm 22 is formed with a forked and/or bifurcated end 28 which receive an end of the arm 23.

The articulation means of the armature 5 by the articulated link 21 using the coupling ink 20 which connects the armature 5 to the casing wall 9 and the stops 31 and/or 31' arranged in the swivel path of the articulated link 21 ensure that the armature 5 does not hit the stator 3 during the advanced movement toward the stator during the reciprocating movement of the armature. The swivel arrangement can also be limited precisely so that the remaining air gap can be maintained very small and an optimum electrical efficiency of the reciprocating armature motor 1 is insured.

Figure 3:
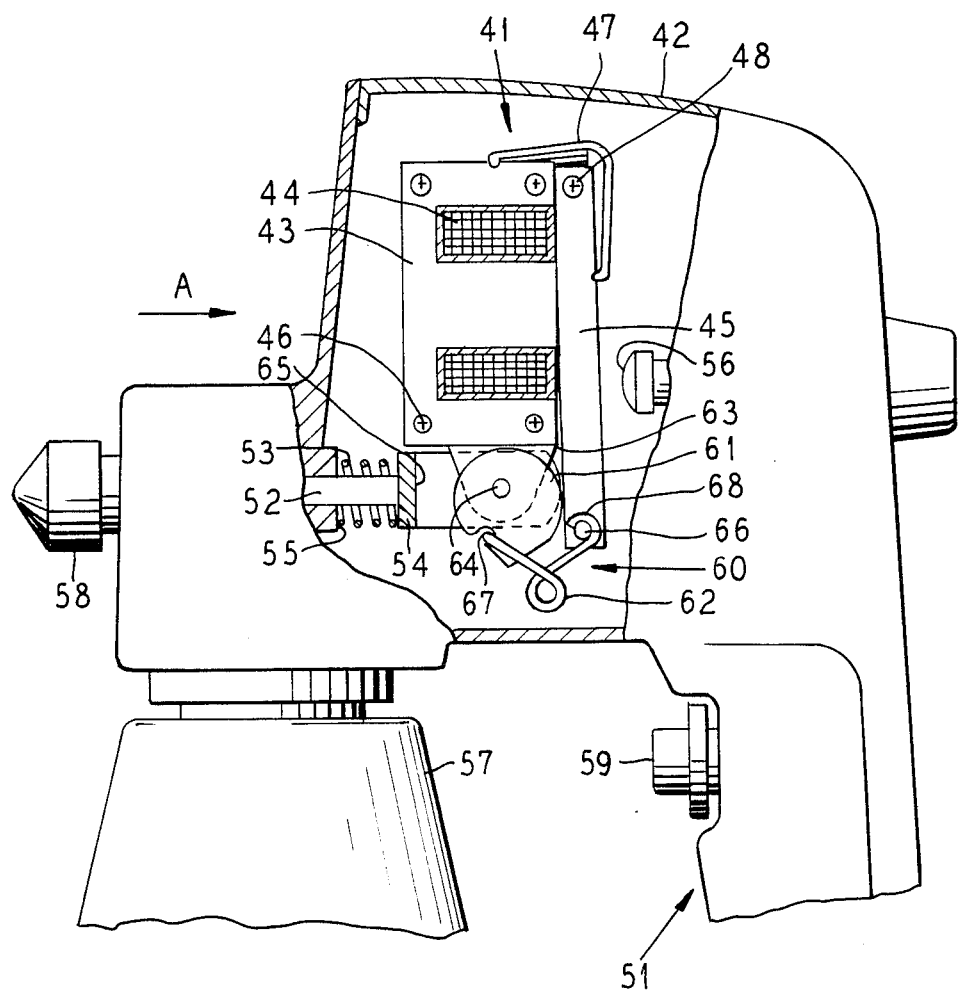
FIG. 3 is a side view with portions broken away of a paint spray gun having an reciprocating armature motor utilizing an embodiment of the coupling link in accordance with the present invention.
Figure 4:
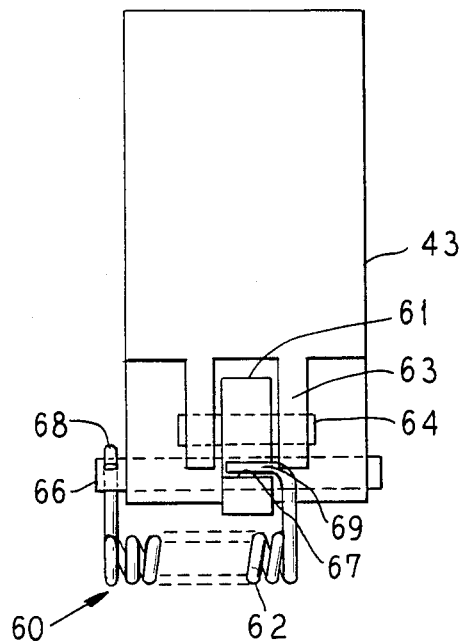
FIG. 4 is an end view taken in the direction of arrow A of FIG. 3 with portions removed for purposes of illustration of the coupling link.
Figure 5:
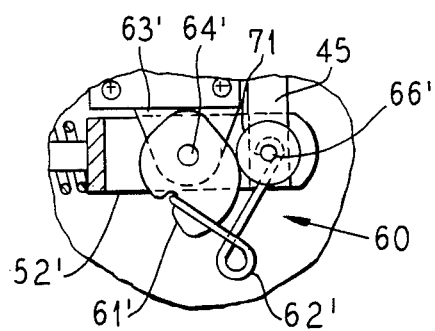
FIG. 5 is a cross-sectional view illustrating a modification of the coupling link of FIG. 3.

An embodiment of the reciprocating armature motor is generally indicated at 41 in FIGS. 3, 4 and 5. The armature motor 41 is comprised of a stationarily located stator 43 which is fixed in a casing 42 by means of screws or bolts 46. The stator 43 is provided with a solenoid 44 and an armature 45 is pivotally connected at a first or one end by an articulation pin or pivot pin 48. In addition, a spring 47 is present to urge the armature to the closed position which is illustrated in FIG. 3.

The equipment for which the reciprocating armature motor 41 is used is illustrated as a spray gun 51. The armature 45 acts in this case on a shaft 52 of a piston pump (not shown), which pump causes the spraying liquid to be drawn out of a container 37 which is screwed onto the casing 42 and ejected through a nozzle 58. The switch or trigger 59 is used to start the reciprocating armature motor 41.

If the solenoid 44 is connected to an electrical power circuit and thus energized, the magnetic field of the stator 43 attracts the armature 45 to the position illustrated in FIG. 3. The movement to this position is assisted by the spring 47. However, a recoil force of a coil spring 53 has to be overcome. As illustrated, the spring 53 is carried on a shaft 52 between a collar 54 of the shaft 52 and a face or shoulder 55 of the casing 42. The reciprocating movement of the pump piston within the reciprocating range of the armature 45 is adjusted by a screw 56 causing the spraying liquid to be drawn from the container 57 and to be ejected through the spray nozzle 58.

In accordance with the present invention, means for controlling the reciprocating motion of the armature 45 includes a coupling link generally indicated at 60 in FIGS. 3, 4 and 5. The coupling link connects the second end of the armature 45 with a stationary structural element. As illustrated, the coupling link 60 includes a rotary cam disk 61, which is mounted for rotary movement by a pin 64 to a centrally positioned fork-shaped projection or lug 63 of the stator 43. Coacting with the rotary disk 61 is a torsion spring 62 which has one end 69 hooked in a slot 67 in the cam disk 61 and the other end 68 hooked on a pin 66 carried by the second end of the armature 45. Thus, in spite of the regularly varying distance between the pin 66 and the slot 67 which change in distance depends on the pivotal movement of the armature 45, nevertheless a positive connection is insured between the armature 45 and the cam disk which are in constant engagement with each other.

The external contour of the cam disk 61, the pivot points formed by the pin 66, and the slot 67 for the torsion spring 62 are chosen in such a way that no spring load is exerted by the torsion spring 62 over the entire reciprocating range of the armature 45. This arrangement is used to prevent power losses. It is natural that by choosing an external contour of the cam disk 61, the remaining air gap between the stator 43 and the armature 45 can be adjusted due to the fact that the armature 45 is in permanent contact with the disk 61 and no contact noise will be generated.

In the configuration shown in FIGS. 3 and 4, the end of the shaft 52 which acts on the armature 45 and is provided with a fork shape having a recess 65 which receives the projection 63 of the stator 43 and the cam disk 61. The armature 45 engages the shaft 52 at its extreme end so that jamming is almost impossible.

A modification of the embodiment is illustrated in FIG. 5. In this modification, the marginal or lateral section of the stator 43 is provided with projections 63' which has holding pin 64' which supports the rotary cam disk 61'. The piston 52' straddles with its fork-shaped end the projection 63' and the cam disk 61 and is pivotally mounted on the armature 45 by means of the pin 66' which also supports one end of the torsion spring 62'. The contact face with which the armature 45 engages the cam disk 1 is formed in the present configuration by a rotary disk or rollers which form cam followers 71 which are also rotatably mounted on the pin 66'. With this arrangement, any friction between the components is reduced even more than in the embodiments of FIGS. 3 and 4.

The cam disk 61' can therefore be used as an adjustable stop with which the armature 45 is in continuous contact by means of the coupling link 60 so that the reciprocating advance movement of the armature 45 and the remaining air gap between the armature 45 and the stator 43 can be easily controlled.

Although various minor modifications may be suggested by those versed in the art, it should be understood that we wish to embody within the scope of the patent granted hereon, all such modifications as reasonably and properly come within the scope of our contribution to the art.

We claim:

1. An reciprocating armature motor to electrically drive equipment, in particular for use in driving piston pumps of paint spray guns, diaphragm compressors and the like, said motor having a stator holding a solenoid, an armature being pivotally mounted at one end to the stator and having a second end acting upon a member of the equipment to be actuated to move the member back and forth along a path when the armature moves relative to the stator with a reciprocating motion, and means for controlling the reciprocating motion of the armature including means for forming a positive link between the armature and a stationary element including a coupling link, which varies in its movement depending upon the reciprocations of the armature, said means limiting movement of said armature toward said stator effective to limit contact of said armature with said stator.

2. An reciprocating armature motor according to claim 1, wherein the coupling link comprises a double arm articulated link comprising a pair of arms pivotally connected together, one of said pair of arms being pivotally connected to the second end of the armature and the other arm of said pair being pivotally connected to a stationary structural element, stop means cooperating with the double arm articulated link to limit movement of the link to a straight line position, to limit the advance of the armature toward the stator.

3. An reciprocating armature motor according to claim 2, wherein the one arm is pivotally connected to the armature by means of an articulation pin passing through the armature.

4. An reciprocating armature motor according to claim 3, wherein the member is pivotally connected to the articulated pin which connects the one arm of the articulated link to the armature.

5. An reciprocating armature motor aocording to claim 2, wherein the other arm of the articulated link is pivotally connected by a pin to a lug positioned on one wall of the housing of the reciprocating armature motor.

6. An reciprocating armature motor according to claim 2, wherein the one arm of the articulated link has a forked end for receiving the other arm to form the pivotal connection therebetween.

7. An reciprocating armature motor according to claim 2, wherein the articulated link includes a stop plate attached to one of said arms, said stop plate engaging a stop provided on the housing as the articulated link moves to a straight line position to limit movement of the armature toward the stator.

8. An reciprocating armature motor according to claim 7, wherein the stop is adjustably positioned in the housing to enable adjustment of the position of limited movement for the armature.

9. An reciprocating armature motor according to claim 2, wherein the stop is a cap of flexible elastic material positioned to engage one of the arms of the articulate link as it moves to the extended position to limit movement toward the extended position.

10. An reciprocating armature motor according to claim 9, wherein said stop is adjustably positioned in the housing to enable adjusting the position of movement.

11. An reciprocating armature motor according to claim 1, wherein the coupling link comprises at least one cam disk and at least one torsion spring, means for mounting the cam disk on the stator for rotation and said torsion springs being pivotally connected to the cam disk and to the second end of the armature.

12. An reciprocating armature motor according to claim 11, wherein the means for mounting comprises a fork-type lug extending centrally from the stator and a pin.

13. An reciprocating armature motor according to claim 12, wherein the end of the member has a fork shape forming a recess for receiving the projecting lug of the stator, and the cam disk with the portions of the fork-shaped end extending past the lugs for engagement with the armature.

14. An reciprocating armature motor according to claim 11, wherein the torsion spring has one end formed in a hook engaging a pin carried by the armature and the other end being received in a slot formed in the cam disk extending parallel to the axis of rotation therefor.

15. An reciprocating armature motor according to claim 11, wherein the armature includes a cam follower mounted for rotation for forming an engagement surface with the cam disk.

16. An reciprocating armature motor according to claim 15, wherein the pin mounting the cam follower pivotally connects the member being actuated to the second end of the armature.

17. An reciprocating armature motor according to claim 11, wherein the external contour of the cam disk is chosen so that the cam disk is in contact with the armature at the same point independent of the particular reciprocating motion of the armature relative to the stator.

18. An reciprocating armature motor according to claim 11, wherein the external contour of the cam disk and the pivot points of the torsion spring are chosen so that no spring load is exerted by the torsion spring over the entire range of reciprocating motion of the armature.

19. An reciprocating armature motor according to claim 11, wherein said means for mounting comprises a fork-shaped lug positioned adjacent a lateral position of the stator and a pivot pin.

* * * * *